United States Patent [19]

Larsen

[11] 4,016,678
[45] Apr. 12, 1977

[54] SEEDLING TRANSPLANT CONTAINERS

[75] Inventor: Ronald Leslie Larsen, Minneapolis, Minn.

[73] Assignee: Conwed Corporation, St. Paul, Minn.

[22] Filed: May 5, 1975

[21] Appl. No.: 574,263

Related U.S. Application Data

[63] Continuation-in-part of Ser. No. 436,215, Jan. 24, 1974, abandoned.

[52] U.S. Cl. .......................................... 47/77; 47/84
[51] Int. Cl.² .......................................... A01G 9/02
[58] Field of Search ........... 260/7.5; 47/1.2, 14–16, 47/33–38.1

[56] References Cited

UNITED STATES PATENTS

| | | | |
|---|---|---|---|
| 1,200,396 | 10/1916 | Southard | 47/34 |
| 1,959,139 | 5/1934 | Otwell | 47/37 |
| 1,993,620 | 3/1935 | Otwell | 47/37 |
| 2,949,699 | 8/1960 | La Petina et al. | 47/37 |
| 3,184,890 | 5/1965 | McKey | 47/37 |
| 3,302,325 | 2/1967 | Ferrand | 47/37 |
| 3,375,607 | 4/1968 | Melvold | 47/37 |
| 3,709,623 | 1/1973 | Jackson et al. | 47/37 X |
| 3,755,962 | 9/1973 | Walters et al. | 47/34 |
| 3,798,837 | 3/1974 | Oehmke et al. | 47/37 |
| 3,844,987 | 10/1974 | Clendinning et al. | 260/7.5 |

FOREIGN PATENTS OR APPLICATIONS

| | | | |
|---|---|---|---|
| 1,518,032 | 3/1968 | France | 47/37 |
| 1,908,392 | 9/1970 | Germany | 47/37 |
| 1,186,730 | 4/1970 | United Kingdom | 47/37 |

OTHER PUBLICATIONS

"Timber Management" Oct. 1970 *Equipment Development and Test Program;* Progress Fiscal Year 1970, Plans Fiscal Year 1971 U.S.D.A. Forest Service pp. 37 and 38.

"Assessment of Different Types of Containers for Growing Seedlings in Alberta" F. Endean *Proceedings of a Workshop on Container Planting in Canada* Dept. of the Environment, Canadian Forestry Service, Jan. 1972 pp. 199–128.

"Field Survival of Containe–Grown Jeffery Pine Seedlings Outplanted on Adverse Sites" E. L. Miller & J. D. Budy, pp. 377–383 in Proceedings of the North American Containerized Forest Tree Seedling Symposium, Great Plains Agricultural Council Publication No. 68, 1974.

*Primary Examiner*—Edgar S. Burr
*Assistant Examiner*—James R. Feyrer
*Attorney, Agent, or Firm*—Eyre, Mann, Lucas & Just

[57] ABSTRACT

A seedling transplant container is disclosed. The container is a net-like tube preferably with an open bottom and having one set of strands which is of substantially greater strength (at least 25% and preferably 50%) than the other set of strands so that the container can be machine planted but yet easily ruptured by the growing plant.

8 Claims, 4 Drawing Figures

SEEDLING TRANSPLANT CONTAINERS

The present application is a continuation in part of my prior application Ser. No. 436,215 filed Jan. 24, 1974, now abandoned.

The present invention relates to a new and useful seedling transplant container. Seedling transplant containers are in large use where it is necessary or desirable to initially grow a plant in controlled conditions such as in a nursery before placing the plant in the environment in which it is to grow. Perhaps the largest use of seedling transplant containers is in the forestry industry for the planting of seedling trees.

There are a number of types of seedling transplant containers generally available including cardboard, plastic sheet, fine mesh fabrics and the like. Existing seedling containers, however, have a number of drawbacks. If the container has a bottom, it has been found to be disadvantageous to use with a plant which has a tap root. The tap root of the seedling upon reaching the bottom, whether solid, net or otherwise, will corkscrew. When it is later planted either with or without the container it will maintain the corkscrew shape and be root bound. The tree will frequently not grow very large or, if it does grow to near normal size, it will usually be prematurely choked to death.

The seedling container should be strong enough so that it can be machine planted but yet is should be weak enough so that as the roots expand they can relatively easily rupture the container. Known seedling containers that have the stength to be used with machine planters usually have so much strength that they are not easily ruptured by the growing root system thus over-confining the root system resulting either in a plant which grows very slowly or does not grow at all.

Another desirable feature of seedling containers is that they be perforated along their sidewalls to a degree sufficient to permit chemicals and moisture to enter the container and to permit feeler roots to leave the container in search of nutrients. Known containers which are perforated generally do not have the structural integrity necessary to be used with machine planters or they are not sufficiently perforated to pass the necessary water, nutrients and feeler roots.

In accordance with the present invention, these disadvantages of known seedling planters are overcome by making the seedling planter of a mesh-type structure having at least two sets of spaced strands which cross each other and are integrally joined to each other. One set of strands, the strands in the longitudinal direction of the seedling transplant container, is rigid and strong and permits the seedling container to be used with machine planters. The other set of strands, which is transverse to the longitudinal set of strands, is of considerably less strength than the first set of strands and is relatively distendable in order to assist the break-up of the container by pressure of the roots in the ultimate planting spot of the seedling. The longitudinal strands are made at least 25% stronger than the transverse strands and are preferably made at least 50% stronger.

In the preferred embodiment of the invention, and especially where the plant with which the seedling container is to be used has a tap root, the structure of the container is preferably a seamless structure which is essentially cylindrical with an open top and bottom. The open bottom permits the tap root to grow straight down without impedance thus helping to ensure a strong, healthy plant.

Where the plant does not have a tap root, the bottom of the container can be pointed and the shape of the container can be essentially conical or wedge shaped. This has considerable advantage in the machine planting of the seedlings. The pointed bottom may be made for example by pinching and tacking or heat sealing of the machine direction strands of the tube, or the container can be cast or molded of a conical configuration. In either case, the tube itself is preferably seamless and strands of each of the sets of strands are spaced resulting in an open mesh structure to permit the passage of nutrients, water and feeler roots as hereinbefore described.

The process useful for making the products from which the seedling containers of the present invention are made are not of our invention. Suitable extrusion processes are disclosed in Galt, U.S. Pat. No. 3,384,692, Hureau, U.S. Pat. No. 3,252,181, Martin, U.S. Pat. No. 3,112,526, Mercer, U.S. Pat. No. 2,919,467, or Gaffney, U.S. Pat. No. 3,700,521. Other known casting and molding processes may be used, if desired.

These and other aspects of the present invention may be more fully understood with reference to the drawings in which.

The container comprises two sets of strands, one in the longitudinal or machine direction and one in a direction normal and transverse thereto. The machine direction strands 12 are a series of parallel spaced strands of greater cross section than the transverse direction strands 14. The machine direction strands are shown as round but may be in any shape including square, triangular, etc.

Transverse strands 14 are of lesser cross-section that the machine direction strands 12. The diameter of the transverse strands should be great enough to give the container structural integrity during machine planting operations but yet should be small enough so that the roots will not be impeded by the container e.g., the container will break apart without difficulty as the plant grows or the strands will stretch allowing the plant to grow. The location of the transverse strands is not critical. They may either be joined to the middle of the machine direction strands as shown or they may be on the inside or the outside of the machine direction strands.

While in the preferred embodiment of transverse strands are of lesser cross-section than the machine direction strands, this is not necessary. The only necessary criteria is that the transverse direction strand be of materially less strength than the machine direction strand, i.e. that the machine direction strands be at least 25% and preferably 50% stronger than the transverse direction strands. Numerous methods of accomplishing this will occur to those skilled in the art. For example, this transverse direction strands could be made of a different material from the machine direction strands. Alternatively the joint between the machine direction strands and the transverse direction strands could be made relatively weak so that the transverse direction strands will be weaker. The machine direction and transverse direction strands could even be initially of the same diameter and material and then a partial cut could be made in the transverse strands to weaken them.

Figure 1:
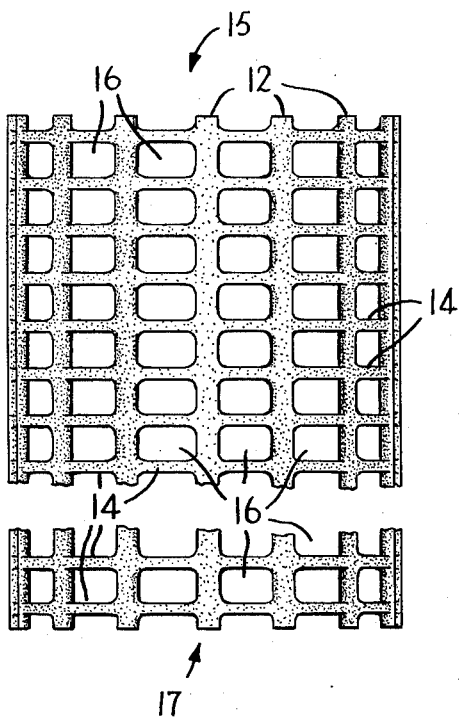
FIG. 1 shows a front view of a seedling container made from a cylindrical net tube made in accordance with the teaching of the Galt patent.
Figure 2:
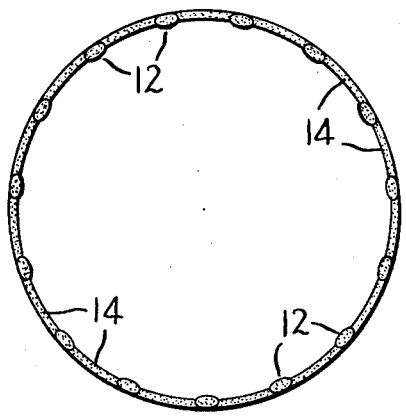
FIG. 2 shows a top view of the seedling container of FIG. 1.

Referring again to FIG. 1, perforations 16 are formed by the crossing of the two sets of strands and these perforations aid in getting nutrients and water to the plant and in permitting roots to egress from the container. In accordance with the preferred embodiment, the planter has both an open top 15 and an open bottom 17.

Figure 3:
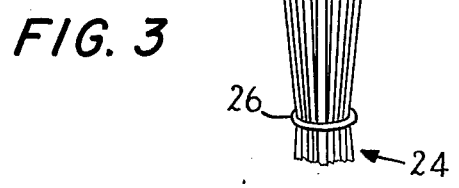
FIG. 3 shows a seedling container with a pointed bottom.

In FIG. 3 there is shown a seedling container with a pointed bottom. A cylindrical container as in FIG. 1 with machine direction strands 18, transverse direction strands 20 and perforations 22 has been pinched together at its bottom 24 and tacked together with wire ring 26. The pointed bottom 24 aids in penetration of the ground when the seedlings are planted. Further, this construction tends to retain the root soil better than does the construction of FIG. 1.

The pointed container can also be made in other ways, and some of these may be used with plants having a tap root. For example, the container can be made with only machine direction strands at the bottom and no transverse direction strands as shown in FIG. 3. The machine direction strands can then be joined by heat, sealing, stapling, bundling with wire (as shown) or twine, or other known means. The openings between the machine direction strands can even be made great enough to permit passage of a tap root.

Figure 4:
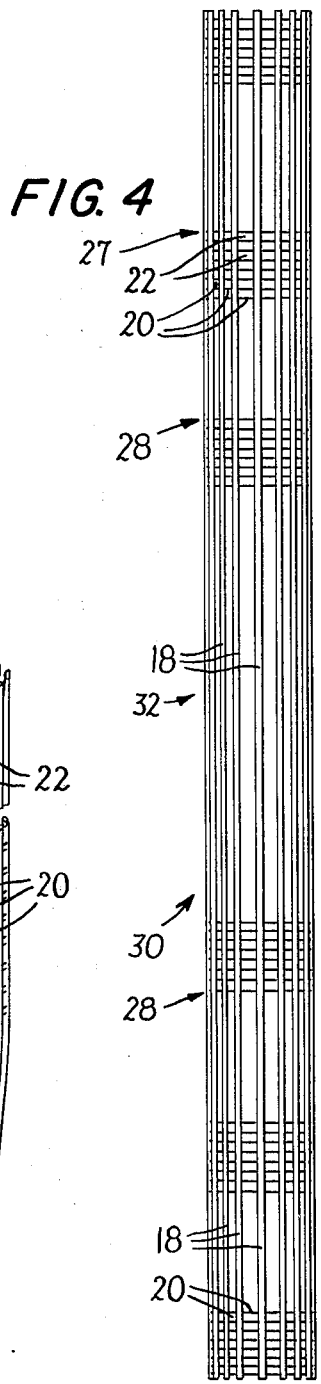
FIG. 4 shows a tube which the seedling container of FIG. 3 can be prepared.

The pointed bottom containers of FIG. 3 can suitably be made from a continuous tube 30 as shown in FIG. 4. Referring to the top part of FIG. 4, a cut can be made for example at 27 to make the containers. Alternatively, as shown in the middle of the drawing, cuts can be made at 28 for the tops of the containers and the bottoms of the containers could be made by cutting at 32. It will be understood that various other procedures can also be used for making the seedling transplant containers whether pointed or cylindrical.

The pointed bottom of the container can be made biodegradable or slowly water soluble so that it does not stand in the way of the tap root. Additionally, if the pointed bottom is made so that it will fracture upon planting to a degree sufficient to pass the tap root the pointed container can be used with plants having tap roots. The fracturing can be either of the tube itself or of the fastening means used to shape the tube to a point.

The plastic material from which the container is made is not overly critical but should be within the following guidelines. The preferred materials are soluble resins. These materials include, for example, slowly dissolving water soluble cellulose or biodegradable materials such as high amylose starch materials disclosed in U.S. Pat. No. 3,243,308. Where the material is not water soluble or biodegradable it may be a thermoplastic material, which should preferably be an amorphous material rather than a crystalline material at least for the transverse direction strands. Crystalline materials will resist breaking by the roots as they try to grow whereas amorphous materials will more readily give way to the growing plant. Crystalline materials may be used throughout, however, where the transverse strands are materially weaker than the machine direction strands either because of reduced cross-section or tailored joints, etc.

As stated hereinbefore, different materials may be used for the machine direction and transverse direction strands. For example, polypropylene may be used for the machine direction strands because of its good strength and hydroxypropyl cellulose may be used for the transverse strands since it is materially weaker, i.e., it will break down in use because of its water solubility.

In the one specific embodiment of the invention, the material used for the seedling was crystalline polypropylene. The seedling was Loblolly pine and the container had approximately the following dimensions. The height of the container was approximately 6 inches and the diameter of the total cylinders was approximately one inch. There were approximately 15 strands per inch in the machine direction and each strand was oval, approximately 0.1 inch wide by 0.05 inch thick. In the transverse direction there were approximately eight strands per inch and each strand had a cross-sectional diameter of about 0.03 inch. Where the terms "machine direction" and "transverse direction strands" have been used herein, it will be understood that this has been done merely to differentiate between two sets of strands and not to described any particular net. For example, in the Mercer patent mentioned hereinbefore, both sets of strands will come out in the machine direction but for the purposes of this invention one set of strands will arbitrarily be called the machine direction and the other will be called the transverse direction. Further, it will be understood that there may be more than two sets of strands if desired.

It will be understood that the claims are intended to cover all changes and modifications of the preferred embodiments of the invention, herein chosen for the purpose of illustration, which do not constitute departures from the spirit and scope of the invention.

What is claimed is:

1. A seedling transplant container comprising:
   a. a plastic net cylinder having sets of spaced longitudinal and transverse strands;
   b. said longitudinal and transverse strands being integrally joined together at their mutual intersections;
   c. an end region of said cylinder wherein said transverse strands are omitted;
   d. said end region having omitted transverse strands being at least as long as the radius of said cylinder; and
   e. means which pinch together the longitudinal strands in the region having omitted transverse strands whereby at least a truncated conical shape is formed at the end of a substantially cylindrical shape.

2. The seedling transplant container recited in claim 1 wherein said means which pinch is a wire ring.

3. The seedling transplant container recited in claim 1 wherein said means which pinch is heat bonding of the plastic material in said longitudinal strands.

4. The seedling transplant container recited in claim 1 wherein said means which pinch is staples.

5. The seedling transplant container recited in claim 1 wherein said means which pinch is twine.

6. The seedling transplant container recited in claim 1 wherein said means which pinch leave an opening between said pinched transverse strands.

7. The seedling transplant container recited in claim 1 wherein said means which pinch is biodegradable.

8. The seedling transplant container recited in claim 1 wherein at least said transverse strands are biodegradable.

* * * * *